Oct. 24, 1961  W. KADEN  3,005,392
CAMERA CAPABLE OF BEING SET FOR
DIFFERENT TYPES OF OPERATION
Filed Feb. 11, 1960

INVENTOR.
WILLY KADEN
BY

United States Patent Office 3,005,392
Patented Oct. 24, 1961

3,005,392
CAMERA CAPABLE OF BEING SET FOR DIFFERENT TYPES OF OPERATION
Willy Kaden, Munich, Germany, assignor to Agfa Aktiengesellschaft, Leverkusen-Bayerwerk, Germany
Filed Feb. 11, 1960, Ser. No. 8,188
Claims priority, application Germany Feb. 18, 1959
11 Claims. (Cl. 95—11.5)

The present invention relates to cameras.

More particularly, the present invention relates to cameras which are capable of being set for various types of operation.

It is well known to provide present day cameras with automatic devices capable of automatically setting the exposure determining elements of the camera. Thus, these automatic devices are capable of automatically setting the exposure time and the diaphragm aperture size. Also, it is possible to set such cameras for manual operation where desired, and in addition, it is possible to have flash operation of such cameras.

Since it is becoming less and less customary for the operator of such cameras to make manual settings of the various parts of the camera, there is a great danger that the camera will be hooked up to the flash apparatus in order to carry out flash operation when the operator has not remembered to set the camera for flash operation, so that improper camera operation will result in a faulty exposure.

It is accordingly a primary object of the present invention to provide a camera which will make it absolutely impossible for the operator to connect the flash-producing structure to the camera unless the camera has been properly set for flash operation.

It is another object of the present invention to provide an exceedingly simple structure capable of being incorporated into old as well as new cameras for preventing operation of the flash structure except when the camera has been properly set for flash operation.

A further object of the present invention is to provide not only a simple structure, but also one which is exceedingly compact and reliable in operation.

With the above objects in view the invention includes, in a camera, a support means and a manually operable setting means carried by the support means for setting the camera for various different types of operation one of which is flash operation, and in accordance with the present invention the camera includes a preventing means actuated by the setting means and preventing connection of flash-producing structure to the camera except when the setting means is set for flash operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
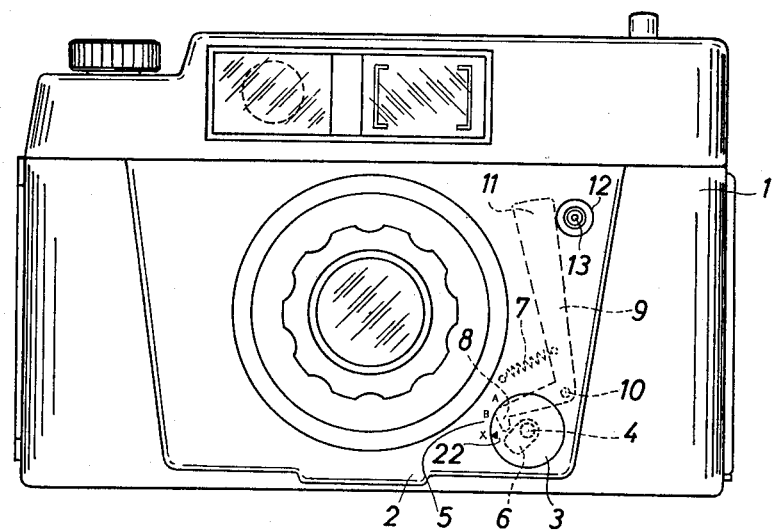
FIG. 1 is a front elevation schematically illustrating a camera provided with one possible embodiment of a structure according to the present invention.

Referring now to the drawings and to FIG. 1 in particular, it will be seen that there is illustrated therein a camera which includes the camera housing 1 which forms a support means for the structure of the invention. The camera housing 1 has a front wall 2 which carries a manually operable setting means 3, 4 for setting the camera for various types of operation. This manually operable setting means which is turnably carried by the support means or housing 1 includes a knob 3 accessible to the operator at the front wall 1, this knob 3 being coaxially fixed with a shaft 4 and being turnable therewith about their common axis. In a conventional manner which does not form part of the invention the operator can turn the setting means 3, 4 to selected angularly positions for setting the camera for various types of operation one of which is flash operation, and for this purpose the manually operable setting means includes an index 22 on the knob 3 capable of being aligned with indicia 5. Thus, this indicia includes the letter "A" which indicates automatic operation, the letter "B" which indicates hand operation, and the letter "X" which indicates flash operation, and of course in the position of the parts shown in FIG. 1 the manually operable setting means 3, 4 has been turned by the operator to a position aligning the index 22 with the letter "X," so that the camera is now set for flash operation.

The front wall 2 of the camera housing 1 is formed with an opening 12 passing therethrough, and inside the camera housing 1 is located an electrical contact 13 which forms part of the structure for producing a flash. Thus, when the operator mounts the flash producing structure on the camera, this latter structure includes an electrical feed which must be connected to the contact 13 so that the camera will produce a flash. With this structure where the contact 13 is located within the camera housing 1 behind the opening 12, it is necessary for the operator to make the connection with the contact 13 by placing the wire through the opening 12 with the end of the wire connected to the contact 13.

In accordance with the present invention there is provided a preventing means which will prevent access to the contact 13 through the opening 12 except when the camera has been set for flash operation. This preventing means includes in the embodiment of FIG. 1 a cam 6 fixed to the shaft 4 for rotation therewith, a lever 9 turnably carried by a support means or housing 1, and a spring 7. The lever 9 is turnably carried by a pivot pin 10 which is in turn fixedly carried by a stationary part of the camera housing 1 or any suitable structure therein, and this lever 9 has one arm which terminates in a projection 8 engaging the cam 6. The spring 7 is connected at one end to a stationary part of the camera and at its opposite end to the other arm of the lever 9 so as to urge the lever 9 in a counterclockwise direction, as viewed in FIG. 1, and thus maintain the projection 8 at all times in engagement with the cam 6. The arm of the lever 9 to which the spring 7 is connected is widened at its free end which is distant from the cam 6, and this widened portion 11 of the lever 9 forms a blocking member capable of preventing access to the contact 13. Thus, as may be seen from FIG. 1, when the manually operable setting means 3, 4 is turned so as to set the camera for manual or automatic operation, which is to say to align the index 22 with the letter "B" or the letter "A," respectively, then the widened portion 11 of the lever 9 is located between the contact 13 and the opening 12 preventing access to this contact 13 so that it is not possible to connect an electrical lead with the contact 13 when the camera is set for manual or automatic operation, and thus it is possible with the above-described structure to operate with the flash only when the index 22 is in the position shown in FIG. 1.

Figure 2:
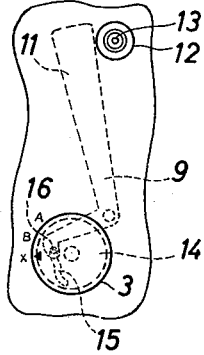
FIG. 2 is a fragmentary illustration of part of a camera provided with another embodiment of a structure according to the invention.

The embodiment of the invention which is illustrated in FIG. 2 is identical with that of FIG. 1 except that instead of a cam 6 a disc 14 is fixed to the knob 3 coaxially therewith in the interior of the camera, and this disc 14 is formed with a camming slot 15 into which extends a pin 16 which is fixed to the lower free end of the lever 9, as viewed in FIG. 2. The curvature of the slot 15 is such that when the knob 3 is in the position shown in FIG. 2 the blocking portion 11 will be out of line with the opening 12 so as to give free access to the contact 13, while when the camera is set for manual or automatic operation by turning the knob 3 to a position aligning the index 22 with the letters "B" or "A," respectively, the lever 9 will turn in a clockwise direction, as viewed in FIG. 2, to the positions in both of which the blocking portion 11 will be located in front of the contact 13 between the latter and the opening 12, in the same way as described above in connection with FIG. 1, and thus with the embodiment of FIG. 2 it will also not be possible for the operator to hook up the flash-producing structure to the camera unless the camera has first been properly set for flash operation. Of course, with the embodiment of FIG. 2 it becomes unnecessary to use a spring similar to the spring 7 of FIG. 1.

Figure 3:
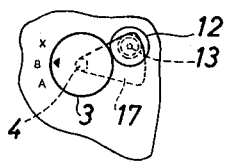
FIG. 3 is a fragmentary illustration of part of a camera where a third embodiment of the structure of the invention is located.

An exceedingly simple embodiment of the invention is illustrated in FIG. 3 where instead of a lever 9 having a widened blocking portion 11, there is a simple sector-shaped lever 17 fixed directly to the shaft 4 of the manually operable setting means 3, 4 for rotation with the latter. Of course, in this embodiment the opening 12 in the wall 2 is located very close to the manually operable setting means 3, 4, and the indicia 5 is arranged differently as may be seen from a comparison of FIGS. 1 and 3. However, the results are the same in that when the index 22 is aligned with the letter "B" so as to set the camera for manual operation, a part of the lever 17 will be located in front of the contact 13 between the latter and the opening 12, as indicated in FIG. 3, so that the contact 13 is not accessible at this time, and of course, as is apparent from FIG. 3, when the knob 3 is turned in a counterclockwise direction, as viewed in FIG. 3, to place the index in alignment with the letter "A" so as to set the camera for automatic operation, a part of the lever 17 will still be located in front of the contact 13 between the latter and the opening 12 preventing access to the contact 13. As may be seen from FIG. 3, only when the knob 3 is turned in a clockwise direction, as viewed in FIG. 3, beyond the position shown in FIG. 3 to a position aligning the index with the letter "X" will the lever 17 be located out of alignment with the opening 12 so as to give free access to the contact 13 so that it is only possible at this time to connect the flash-operating structure to the camera.

Figure 4:
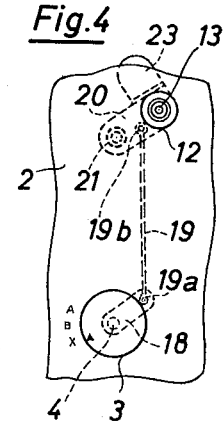
FIG. 4 illustrates a fourth embodiment of a structure according to the present invention forming part of a camera fragmentarily illustrated in FIG. 4.

In the embodiment of FIG. 4 the manually operable setting means and the wall 2 with the opening 12 are identical with those of FIG. 1. However, in this embodiment the contact 13 is carried by a lever 20 which is supported for turning movement by a hollow pivot pin 21 which is fixedly supported in the interior of the camera in any suitable way, and this hollow pivot pin 21 serves as part of the structure to which the electrically conductive wires are connected for producing the circuit for flash operation. Thus, the contact 13 will turn with the lever 20, and the contact 13 as shown in FIG. 4 in alignment with and behind the opening 12 so as to be freely accessible. This lever 20 has a portion which carries the contact 13 and which is aligned with the opening 12 behind the latter in the interior of the camera when the lever 20 is in the illustrated angular position.

In the embodiment of FIG. 4 the shaft 4 of the manually operable setting means fixedly carries a lever 18 which carries a pin 19a, and the lever 20 carries a pin 19b, and a connecting rod 19 is pivotally connected at its ends respectively to the pins 19a and 19b so that the angular position of the lever 20 will be determined by the angular position of the lever 18, and of course the angular position of the lever 18 is determined by the angular position of the manually operable setting means 3, 4. In the position illustrated in FIG. 4 where the index of the knob 3 is aligned with the letter "X," the angular position of the lever 20 is such that the contact 13 is aligned with the opening 12 so as to be freely accessible therethrough, and it is apparent that in the other positions of the manually operable setting means 3, 4 where the camera is set for other types of operation such as manually or automatic operation, the angular position of the lever 20 will be such that the contact 13 will be out of line with and inaccessible through the opening 12.

In the embodiment of FIG. 4 the lever 20 carries a stepped extension one step of which extends perpendicularly from the upper edge of lever 20, as viewed in FIG. 4, toward the wall 2 of the camera, and the other step of which extends parallel to the wall 2 and engages the inner surface of the latter, this other step being indicated at 23 in FIG. 4, and when the manually operable setting means 3, 4 of FIG. 4 sets the camera for types of operation different from flash operation the step 23 will extend across the opening 12 so as to close the latter.

Of course, the lever and connecting rod structure of FIG. 4 may be used in the embodiment of FIGS. 1–3 for the purpose of locating a blocking member or a blocking portion of lever 20 between a stationary contact 13 and an opening 12, or, the levers of FIGS. 1–3 may carry a contact 13 in the manner of FIG. 4, so that in this case the levers of FIGS. 1–3 would be arranged to be turned to angular positions locating the contact 13 in alignment with the opening 12 when the camera is set for flash operation while in the embodiment of FIG. 4 if the lever 20 were used for blocking the opening 12 and the contact 13 were stationary the structure would be arranged to locate the lever 20 out of line with the opening 12 when the camera is set for flash operation.

Naturally the invention is not limited to the specific embodiments thereof described above.

It will be understood that each of the elements described above, or two or more together, may also find a useful application in other types of cameras differing from the types described above.

While the invention has been illustrated and described as embodied in cameras capable of being set for different types of operation, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristic of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing having a wall formed with an opening passing therethrough; manually operable setting means carried by said housing for setting the camera for a plurality of different types of operation one of which is flash operation; an electrical contact forming part of the flash operating structure of the camera and carried by said camera housing in the interior thereof, said contact being accessible through said wall opening at least when said setting means sets the camera for flash operation; and means operatively connected to said setting means and cooperating with said contact for preventing access to the latter except when said setting means sets the camera for flash operation.

2. In a camera as recited in claim 1, said means preventing access to said contact being operatively connected to the latter for maintaining the same out of alignment with said opening except when said setting means sets the camera for flash operation.

3. In a camera as recited in claim 1, said means preventing access to said contact through said opening being in the form of a blocking member actuated by said setting means and placed by the latter between said wall opening and said contact except when said setting means sets the camera for flash operation, so that said blocking member prevents access to said contact through said opening except when the camera is set for flash operation.

4. In a camera, in combination, a camera housing having a wall formed with an opening passing therethrough; an electrical contact forming part of the flash operating apparatus of the camera and located in said housing behind said wall in aligned position with said opening thereof so as to be accessible through said opening; a lever turnably carried by said housing for movement to a plurality of positions one of which locates said lever between said contact and said wall opening to prevent access to said contact through said opening when said lever is in said one position thereof; and manually operable setting means carried by said housing for setting the camera for a plurality of different types of operation one of which is flash operation, said setting means operating with said lever for placing the same in said one position thereof except when said camera is set for flash operation so that when the camera is set for flash operation the lever will be out of line with said opening to provide free access to said contact through said opening.

5. In a camera, in combination, a camera housing having a wall formed with an opening passing therethrough; an electrical contact forming part of the flash operating apparatus of the camera and located in said housing behind said wall in aligned position with said opening thereof so as to be accessible through said opening; a lever turnably carried by said housing for movement to a plurality of positions one of which locates said lever between said contact and said wall opening to prevent access to said contact through said opening when said lever is in said one position thereof; and manually operable setting means carried by said housing for setting the camera for a plurality of different types of operation one of which is flash operation, said setting means operating with said lever for placing the same in said one position thereof except when said camera is set for flash operation so that when the camera is set for flash operation the lever will be out of line with said opening to provide free access said contact through said opening, said setting means including a manually turnable member carried by the camera housing, a cam carried by said turnable member for rotary movement therewith, said lever engaging said cam to be turned upon turning of said cam, and a spring cooperating with said lever for maintaining the same in engagement with said cam.

6. In a camera, in combination, a camera housing having a wall formed with an opening passing therethrough; an electrical contact forming part of the flash operating apparatus of the camera and located in said housing behind said wall in aligned position with said opening thereof so as to be accessible through said opening; a lever turnably carried by said housing for movement to a plurality of positions one of which locates said lever between said contact and said wall opening to prevent access to said contact through said opening when said lever is in said one position thereof; and manually operable setting means carried by said housing for setting the camera for a plurality of different types of operation one of which is flash operation, said setting means operating with said lever for placing the same in said one position thereof except when said camera is set for flash operation so that when the camera is set for flash operation the lever will be out of line with said opening to provide free access to said contact through said opening, said setting means including a rotary member and a disc fixed thereto for rotary movement therewith, said disc being formed with a camming slot, and said lever having a pin located in said slot so that upon turning of said disc said lever will be turned to be moved to and from said one position thereof.

7. In a camera, in combination, a camera housing having a wall formed with an opening passing therethrough; an electrical contact forming part of the flash operating apparatus of the camera and located in said housing behind said wall in aligned position with said opening thereof so as to be accessible through said opening; a lever turnably carried by said housing for movement to a plurality of positions one of which locates said lever between said contact and said wall opening to prevent access to said contact through said opening when said lever is in said one position thereof; and manually operable setting means carried by said housing for setting the camera for a plurality of different types of operation one of which is flash operation, said setting means operating with said lever for placing the same in said one position thereof except when said camera is set for flash operation so that when the camera is set for flash operation the lever will be out of line with said opening to provide free access to said contact through said opening, said setting means including a rotary member and said lever being fixed to said rotary member for turning movement therewith and said rotary member placing said lever in said one position thereof except when said setting means sets the camera for flash operation.

8. In a camera, in combination, a camera housing having a wall formed with an opening passing therethrough; a first lever turnably carried by said wall in the interior of said housing and being turnable to and from a position where a portion of said first lever is aligned with said opening; an electrical contact carried by said portion of said lever and forming part of the flash operating structure of the camera, said contact therefore being aligned with said opening when said lever is in said position thereof; manually operable setting means carried by the camera housing to set the camera for a plurality of different types of operation one of which is flash operation, said settings means including a rotary member; a second lever fixed to said rotary member for turning movement therewith; and a connecting rod interconnecting said levers so that in a predetermined angular position of said rotary member said first lever will be in said position where said contact-carrying portion thereof is aligned with said opening, said setting means setting the camera for flash operation when said rotary member is in said predetermined angular position thereof.

9. In a camera, in combination, a camera housing having a wall formed with an opening passing therethrough; a first lever turnably carried by said wall in the interior of said housing and being turnable to and from a position where a portion of said first lever is aligned with said opening; an electrical contact carried by said portion of said lever and forming part of the flash operating structure of the camera, said contact therefore being aligned with said opening when said lever is in said position thereof; manually operable setting means carried by the camera housing to set the camera for a plurality of different types of operation one of which is flash operation, said setting means including a rotary member; a second lever fixed to said rotary member for turning movement therewith; a connecting rod interconnecting said levers so that in a predetermined angular position of said rotary member said first lever will be in said position where said contact-carrying portion thereof is aligned with said opening, said setting means setting the camera for flash operation when said rotary member is in said predetermined angular position thereof; and a plate carried by said first lever and covering said opening of said wall except when said first lever is in said position thereof.

10. In a camera, in combination, a camera housing; manually operable setting means carried by said housing for setting the camera for a plurality of different types of operation, one of which is flash operation; connecting means carried by said camera housing for attaching parts of the flash operating structure to the camera; and means operatively connected with said setting means and cooperating with said connecting means for preventing access to the latter excepting when said setting means sets the camera for flash operation.

11. In a camera, in combination, a camera housing; manually operable setting means carried by said housing for setting the camera for a plurality of different types of operation, one of which is flash operation; an electrical contact forming part of the flash operating structure of the camera and carried by said camera housing; and means operatively connected with said setting means and cooperating with said contact for preventing access to the latter excepting when said setting means sets the camera for flash operation.

References Cited in the file of this patent

UNITED STATES PATENTS 2,559,151　　Getzoff _____ July 3, 1951